US012573303B2

(12) United States Patent
Wang et al.

(10) Patent No.: US 12,573,303 B2
(45) Date of Patent: Mar. 10, 2026

(54) ALLOCHRONIC OBSTACLE AVOIDANCE SYSTEM FOR PLATOONING AND METHOD THEREOF

(71) Applicant: Automotive Research & Testing Center, Changhua County (TW)

(72) Inventors: Cheng-Hsien Wang, Changhua County (TW); Tsung-Ming Hsu, Changhua County (TW); Ming-Kuan Ko, Changhua County (TW); Zhi-Hao Zhang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 617 days.

(21) Appl. No.: 17/457,252

(22) Filed: Dec. 1, 2021

(65) Prior Publication Data

US 2023/0169871 A1 Jun. 1, 2023

(51) Int. Cl.
*G08G 1/00* (2006.01)
*G08G 1/16* (2006.01)

(52) U.S. Cl.
CPC ............... *G08G 1/22* (2013.01); *G08G 1/162* (2013.01)

(58) Field of Classification Search
CPC .. G08G 1/00; G08G 1/16; G08G 1/22; G08G 1/161; G08G 1/162; G08G 1/163; G08G 1/166; B60T 2201/00; B60T 2201/02; B60T 2201/022; B60T 2210/00; B60T 2210/30; B60T 2210/32; B60T 7/00; B60T 7/12; B60T 7/22; B60W 30/00; B60W 30/14; B60W 30/16; B60W 30/165
USPC ............................................................ 701/96
See application file for complete search history.

(56) References Cited

U.S. PATENT DOCUMENTS

2018/0113477 A1* 4/2018 Rodriguez ........... G05D 1/0293
2019/0346862 A1 11/2019 Switkes et al.
2020/0272142 A1* 8/2020 Beauvillain ............ G05D 1/005
2020/0339125 A1* 10/2020 Reckziegel ........... B60W 40/04
2022/0058955 A1* 2/2022 Park ....................... G07C 5/008
2022/0135085 A1* 5/2022 Wright .............. B60W 60/0025 701/25
2024/0274015 A1* 8/2024 Putney ................. G05D 1/2462

FOREIGN PATENT DOCUMENTS

WO 2015047174 A1 4/2015
WO 2015047181 A1 4/2015

* cited by examiner

*Primary Examiner* — Khoi H Tran
*Assistant Examiner* — Sarah A Tran
(74) *Attorney, Agent, or Firm* — CKC & Partners Co., LLC

(57) ABSTRACT

An allochronic obstacle avoidance system for platooning is configured to decide an obstacle avoidance of a leading vehicle and at least one following vehicle. A sensing device is configured to generate an obstacle position and an obstacle speed. A leading vehicle processing unit is configured to transmit a leading vehicle parameter group. At least one following vehicle processing unit is configured to transmit at least one following vehicle parameter group. A cloud processing unit is configured to implement a cloud deciding step including predicting a leading vehicle free space and at least one following vehicle free space according to the leading vehicle parameter group and the at least one following vehicle parameter group, and deciding the obstacle avoidance of the leading vehicle and the at least one following vehicle according to the leading vehicle free space and the at least one following vehicle free space.

18 Claims, 10 Drawing Sheets

S1222

ALLOCHRONIC OBSTACLE AVOIDANCE SYSTEM FOR PLATOONING AND METHOD THEREOF

BACKGROUND

Technical Field

The present disclosure relates to an obstacle avoidance system for platooning and a method thereof. More particularly, the present disclosure relates to an allochronic obstacle avoidance system for platooning and a method thereof.

Description of Related Art

No matter what the field of logistics and freight transportation or transport, man-hours and manpower allocation are important considerations of operating costs. If a plurality of vehicles have autonomous capability with vehicle platoon following, they can effectively improve operation and carrying efficiency. Because the use of autonomous vehicle platoon can reduce the need for manpower, and commercial transport has relatively simple application scenes, many vehicle manufacturers have invested in the development of autonomous vehicles platoon and hope to achieve commercial autonomous vehicle platoon following as soon as possible.

In a conventional autonomous vehicle platoon following, each autonomous vehicle needs to be equipped with a large number of sensing devices to provide environment perception and positioning ability, thereby having the problems of high cost and excessive calculation amount. In addition, the conventional autonomous vehicle platoon following has no message sharing, and it is impossible to plan a trajectory in advance. Moreover, the free space required by the conventional autonomous vehicle platoon following for the obstacle avoidances of multiple vehicles at the same time needs to meet the space required by each following vehicle at the same time so as to perform the obstacle avoidance. However, the free space required by each following vehicle at the same time is too conservative, and the operating range is too small. Therefore, an allochronic obstacle avoidance system for platooning and a method thereof which are capable of dynamically adjusting the free space, implementing the decision of allochronic obstacle avoidance, taking into account safety and reasonableness and being more intelligent are commercially desirable.

SUMMARY

According to one aspect of the present disclosure, an allochronic obstacle avoidance system for platooning is configured to decide an obstacle avoidance of a leading vehicle and at least one following vehicle. The allochronic obstacle avoidance system for platooning includes a sensing device, a leading vehicle processing unit, at least one following vehicle processing unit and a cloud processing unit. The sensing device is disposed on the leading vehicle and configured to sense an obstacle in a surrounding environment of the leading vehicle to generate an obstacle position and an obstacle speed. The leading vehicle processing unit is disposed on the leading vehicle and signally connected to the sensing device. The leading vehicle processing unit is configured to transmit a leading vehicle parameter group including the obstacle position, the obstacle speed, a leading vehicle position and a leading vehicle speed. The at least one following vehicle processing unit is disposed on the at least one following vehicle and configured to transmit at least one following vehicle parameter group including at least one following vehicle position and at least one following vehicle speed. The cloud processing unit is signally connected to the leading vehicle processing unit and the at least one following vehicle processing unit, and receives the leading vehicle parameter group and the at least one following vehicle parameter group. The cloud processing unit is configured to implement a cloud deciding step including performing a free-space predicting step and an allochronic obstacle avoidance deciding step. The free-space predicting step is performed to predict a leading vehicle free space and at least one following vehicle free space according to the leading vehicle parameter group and the at least one following vehicle parameter group. The allochronic obstacle avoidance deciding step is performed to decide the obstacle avoidance of the leading vehicle and the at least one following vehicle according to the leading vehicle free space and the at least one following vehicle free space.

According to another aspect of the present disclosure, an allochronic obstacle avoidance method for platooning is configured to decide an obstacle avoidance of a leading vehicle and at least one following vehicle. The allochronic obstacle avoidance method for platooning includes performing a cloud deciding step. The cloud deciding step includes performing a free-space predicting step and an allochronic obstacle avoidance deciding step. The free-space predicting step is performed to configure a cloud processing unit of an allochronic obstacle avoidance system to predict a leading vehicle free space and at least one following vehicle free space according to a leading vehicle parameter group and at least one following vehicle parameter group. The allochronic obstacle avoidance deciding step is performed to configure the cloud processing unit to decide the obstacle avoidance of the leading vehicle and the at least one following vehicle according to the leading vehicle free space and the at least one following vehicle free space. The cloud processing unit is signally connected to a leading vehicle processing unit and at least one following vehicle processing unit of the allochronic obstacle avoidance system and receives the leading vehicle parameter group and the at least one following vehicle parameter group. The leading vehicle processing unit is signally connected to a sensing device of the allochronic obstacle avoidance system. The leading vehicle processing unit and the sensing device are disposed on the leading vehicle. The sensing device is configured to sense an obstacle in a surrounding environment of the leading vehicle to generate an obstacle position and an obstacle speed. The leading vehicle processing unit is configured to transmit the leading vehicle parameter group including the obstacle position, the obstacle speed, a leading vehicle position and a leading vehicle speed. The at least one following vehicle processing unit is disposed on the at least one following vehicle and configured to transmit the at least one following vehicle parameter group including at least one following vehicle position and at least one following vehicle speed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
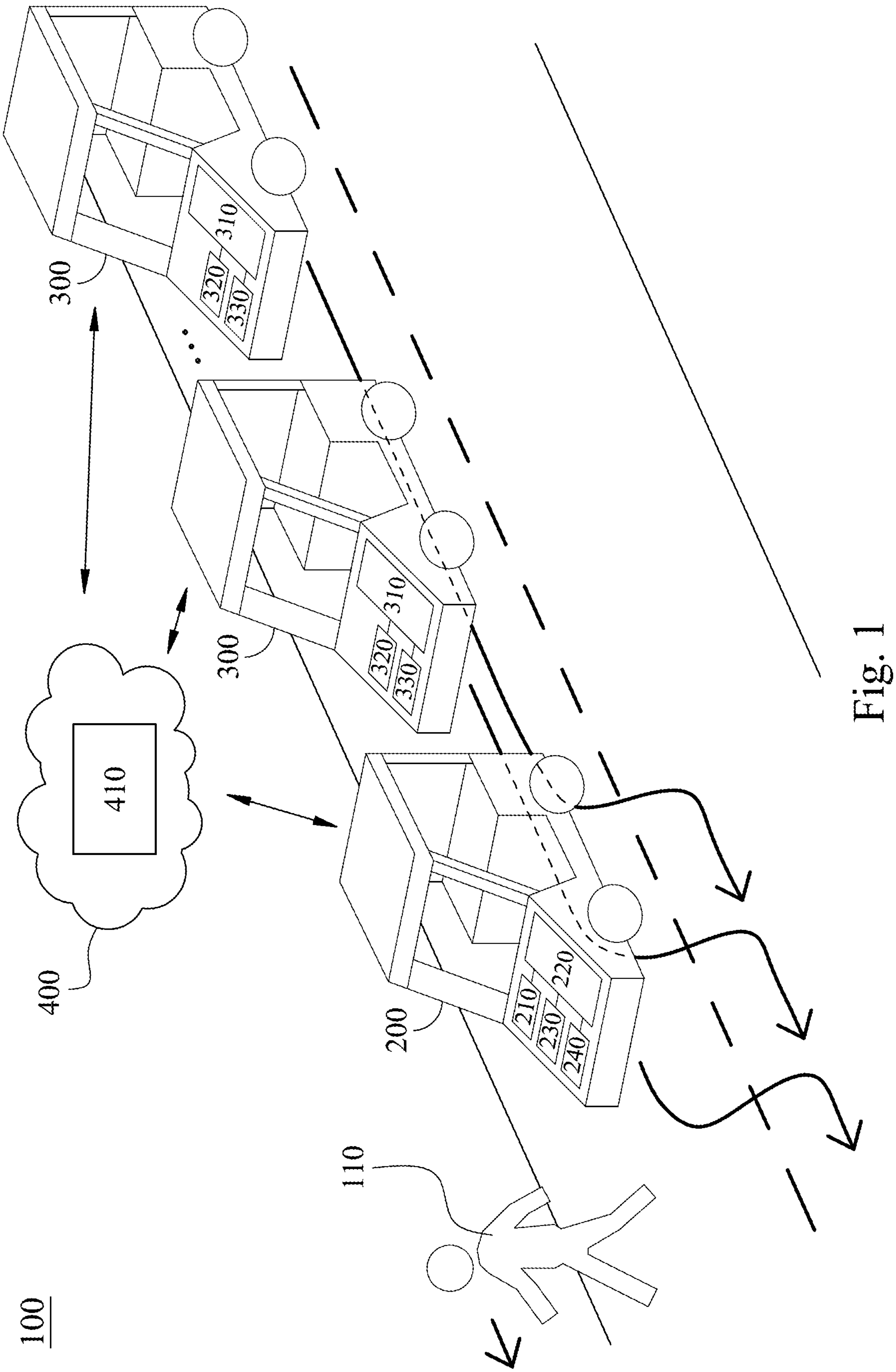
FIG. 1 shows a schematic view of an allochronic obstacle avoidance system for platooning according to a first embodiment of the present disclosure.
Figure 2:
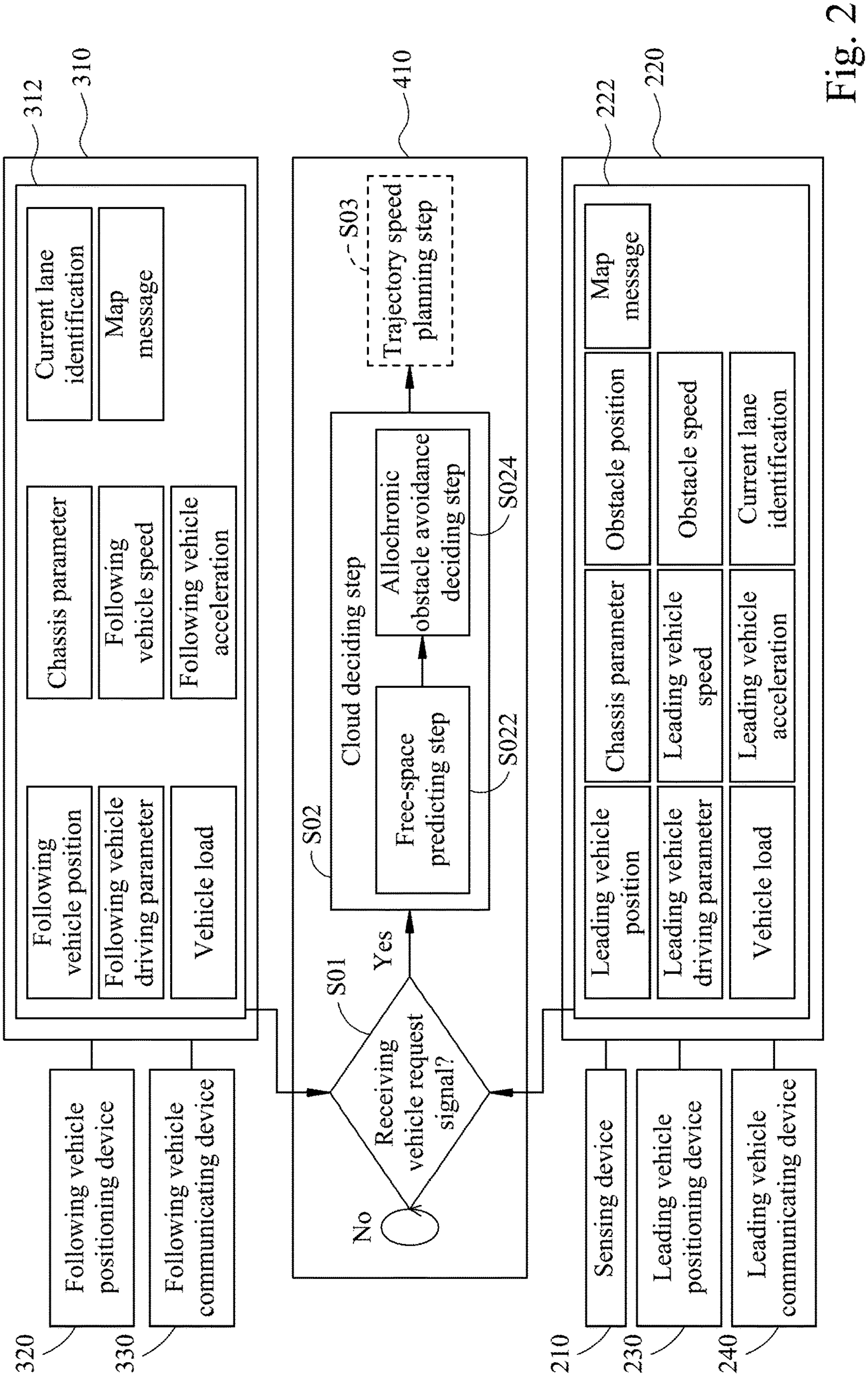
FIG. 2 shows a partial block diagram of the allochronic obstacle avoidance system for platooning of FIG. 1.

Please refer to FIGS. 1 and 2. FIG. 1 shows a schematic view of an allochronic obstacle avoidance system 100 for platooning according to a first embodiment of the present disclosure. FIG. 2 shows a partial block diagram of the allochronic obstacle avoidance system 100 for platooning of FIG. 1. The allochronic obstacle avoidance system 100 for platooning is configured to decide an obstacle avoidance (avoid an obstacle 110) of a leading vehicle 200 and at least one following vehicle 300, and includes the leading vehicle 200, a sensing device 210, a leading vehicle processing unit 220, a leading vehicle positioning device 230, a leading vehicle communicating device 240, the at least one following vehicle 300, at least one following vehicle processing unit 310, at least one following vehicle positioning device 320, at least one following vehicle communicating device 330 and a cloud computing platform 400.

The sensing device 210, the leading vehicle processing unit 220, the leading vehicle positioning device 230 and the leading vehicle communicating device 240 are disposed on the leading vehicle 200. The sensing device 210 is configured to sense the obstacle 110 in a surrounding environment of the leading vehicle 200 to generate an obstacle position and an obstacle speed. In one embodiment, the sensing device 210 may be a lidar, a radar or a camera, but the present disclosure is not limited thereto. The leading vehicle processing unit 220 is signally connected to the sensing device 210, the leading vehicle positioning device 230 and the leading vehicle communicating device 240. The leading vehicle processing unit 220 is configured to transmit a leading vehicle parameter group 222. The leading vehicle parameter group 222 includes the obstacle position, the obstacle speed, a leading vehicle position and a leading vehicle speed. The leading vehicle positioning device 230 is configured to position the leading vehicle 200 to generate the leading vehicle position, such as a global positioning system (GPS). The leading vehicle communicating device 240 is configured to enable the leading vehicle processing unit 220 to communicate with the outside and generate a leading vehicle driving parameter, such as cellular vehicle-to-everything (CV2X). In addition, the leading vehicle parameter group 222 includes the leading vehicle position, the leading vehicle driving parameter, a vehicle load, a chassis parameter, a leading vehicle speed, a leading vehicle acceleration, the obstacle position, the obstacle speed, a current lane identification and a map message. The current lane identification is one of current lane road attributes. For example, the leading vehicle 200 driven in an inner lane of a two lane road can be defined as the current lane identification equal to 1, and the present disclosure is not limited thereto.

The at least one following vehicle processing unit 310, the at least one following vehicle positioning device 320 and the at least one following vehicle communicating device 330 are disposed on the at least one following vehicle 300. The at least one following vehicle processing unit 310 is signally connected to the at least one following vehicle positioning device 320 and the at least one following vehicle communicating device 330. The at least one following vehicle processing unit 310 is configured to transmit at least one following vehicle parameter group 312. The at least one following vehicle parameter group 312 includes at least one following vehicle position and at least one following vehicle speed. The at least one following vehicle positioning device 320 is configured to position the at least one following vehicle 300 to generate the at least one following vehicle position, such as GPS. The at least one following vehicle communicating device 330 is configured to enable the at least one following vehicle processing unit 310 to communicate with the outside and generate at least one following vehicle driving parameter, such as CV2X. In addition, the at least one following vehicle parameter group 312 includes at least one following vehicle position, the at least one following vehicle driving parameter, at least one vehicle load, at least one chassis parameter, the at least one following vehicle speed, at least one following vehicle acceleration, at least one current lane identification and at least one map message, but the present disclosure is not limited thereto. The at least one following vehicle 300 is not equipped with a sensing device, thus greatly reducing the cost of equipment and the calculation amount of each of the at least one following vehicle processing unit 310.

The cloud computing platform 400 includes a cloud processing unit 410. The cloud processing unit 410 is signally connected to the leading vehicle processing unit 220 and the at least one following vehicle processing unit 310, and receives the leading vehicle parameter group 222 and the at least one following vehicle parameter group 312. The cloud processing unit 410 is configured to implement a signal receiving step S01, a cloud deciding step S02 and a trajectory speed planning step S03. The signal receiving step S01 is "Receiving vehicle request signal?", and represents that confirming whether to receive a vehicle request signal. If yes, receiving a vehicle parameter group (e.g., the leading vehicle parameter group 222 or the at least one following vehicle parameter group 312) and performing the cloud deciding step S02. If no, performing the signal receiving step S01 again. Moreover, the cloud deciding step S02 includes performing a free-space predicting step S022 and an allochronic obstacle avoidance deciding step S024. The free-space predicting step S022 is performed to predict a leading vehicle free space and at least one following vehicle free space according to the leading vehicle parameter group 222 and the at least one following vehicle parameter group 312. The allochronic obstacle avoidance deciding step S024 is performed to decide the obstacle avoidance of the leading vehicle 200 and the at least one following vehicle 300 according to the leading vehicle free space and the at least one following vehicle free space. The trajectory speed planning step S03 is performed to configure a trajectory generating module to generate obstacle avoidance trajectories and obstacle avoidance speeds of the leading vehicle 200 and the at least one following vehicle 300 according to an obstacle avoidance decision of the leading vehicle 200 and the at least one following vehicle 300 in the allochronic obstacle avoidance deciding step S024. "allochronic obstacle avoidance" of the present disclosure represents the obstacle avoidance of all vehicles of a vehicle platoon at different time points in the same direction. Therefore, the allochronic obstacle avoidance system 100 for platooning of the present disclosure utilizes the cloud to perform the free-space predicting step S022 and the allochronic obstacle avoidance deciding step S024, so that each of the at least one following vehicle 300 of the vehicle platoon dynamically adjusts the free space according to the relationship between each vehicle and the obstacle 110, and decides the obstacle avoidance of each vehicle according to the free space of each vehicle. The present disclosure can not only reduce the cost of equipment and the calculation amount of each of the at least one following vehicle processing unit 310, but also more safely and reasonably avoid the obstacle 110 to achieve a more intelligent autonomous mode.

Figure 3:
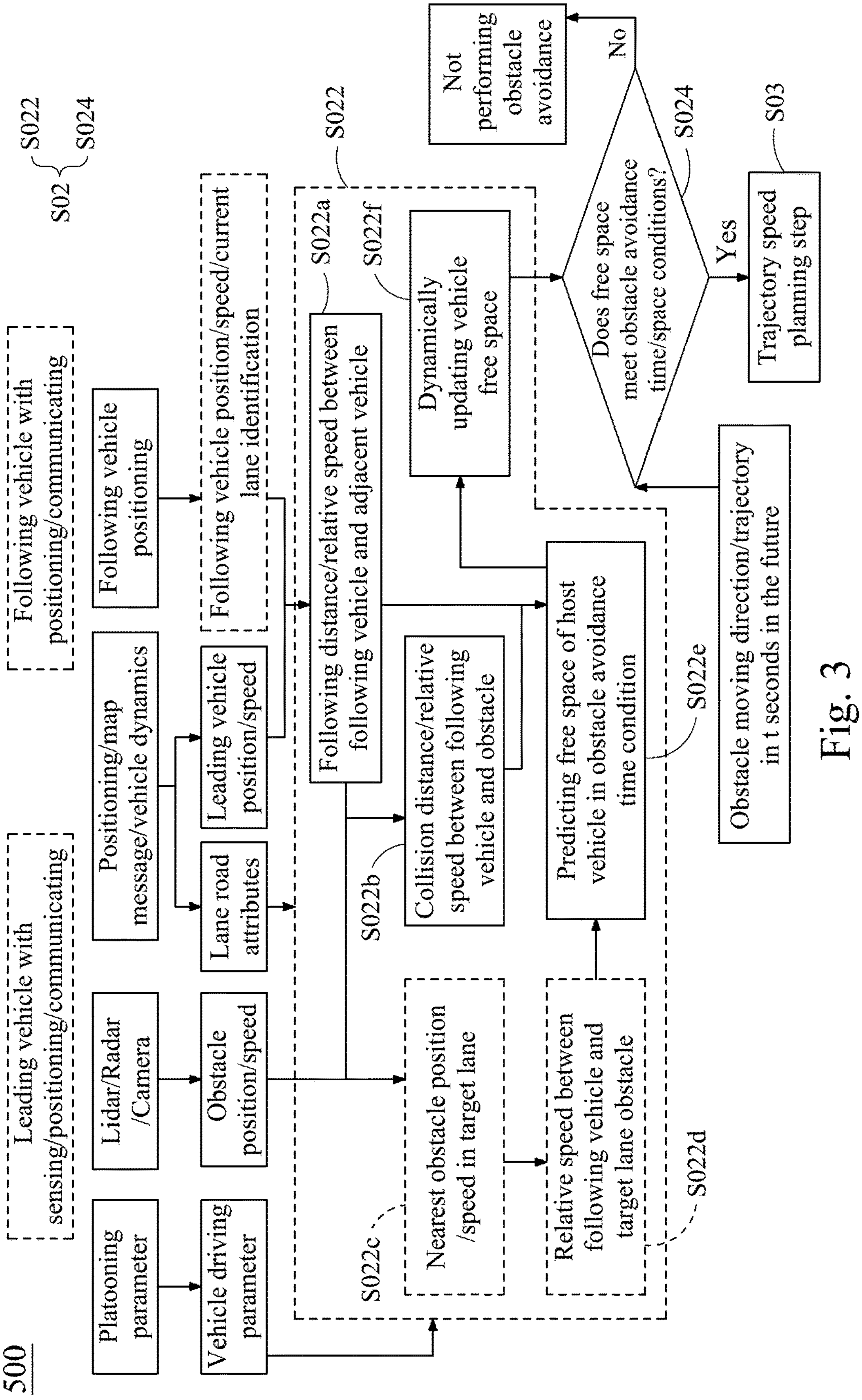
FIG. 3 shows a schematic view of an allochronic obstacle avoidance method for platooning according to a second embodiment of the present disclosure.

Please refer to FIGS. 1, 2 and 3. FIG. 3 shows a schematic view of an allochronic obstacle avoidance method 500 for platooning according to a second embodiment of the present disclosure. The allochronic obstacle avoidance method 500 for platooning is applied to the allochronic obstacle avoidance system 100 for platooning and includes performing a cloud deciding step S02. The cloud deciding step S02 includes performing a free-space predicting step S022 and an allochronic obstacle avoidance deciding step S024.

The free-space predicting step S022 is performed to configure the cloud processing unit 410 of the allochronic obstacle avoidance system 100 for platooning to predict a leading vehicle free space and at least one following vehicle free space according to the leading vehicle parameter group 222 and the at least one following vehicle parameter group 312. In detail, the free-space predicting step S022 includes a plurality of steps S022*a*, S022*b*, S022*c*, S022*d*, S022*e*, S022*f*.

The step S022*a* is "Following distance/relative speed between following vehicle and adjacent vehicle", and represents that configuring the cloud processing unit 410 to calculate a following distance and a first relative speed between the at least one following vehicle 300 and another following vehicle 300 adjacent to the at least one following vehicle 300 according to the leading vehicle position, the leading vehicle speed, the at least one following vehicle position, the at least one following vehicle speed and the current lane identification.

The step S022*b* is "Collision distance/relative speed between following vehicle and obstacle", and represents that configuring the cloud processing unit 410 to calculate a collision distance and a second relative speed between the at least one following vehicle 300 and the obstacle 110 according to the obstacle position, the obstacle speed, the following distance and the first relative speed.

The step S022*c* is "Nearest obstacle position/speed in target lane", and represents that configuring the sensing device 210 to sense a target lane obstacle (e.g., the target lane obstacle 110R in FIG. 9) in a surrounding environment of the at least one following vehicle 300 to generate another obstacle position and another obstacle speed. The target lane obstacle is an obstacle nearest to the following vehicle 300 in a target lane.

The step S022*d* is "Relative speed between following vehicle and target lane obstacle", and represents that configuring the cloud processing unit 410 to calculate a third relative speed between the at least one following vehicle 300 and the target lane obstacle according to the another obstacle position and the another obstacle speed. It is worth to mention that if the sensing device 210 does not sense the target lane obstacle (i.e., there is no obstacle in the target lane), the cloud deciding step S02 does not perform the steps S022*c*, S022*d*.

The step S022*e* is "Predicting free space of host vehicle in obstacle avoidance time condition", and represents that configuring the cloud processing unit 410 to predict the leading vehicle free space and the at least one following vehicle free space according to the following distance, the first relative speed, the collision distance, the second relative speed and the third relative speed. An obstacle avoidance time condition can be expressed in $[0, \Sigma_{0 \le k \le i-1} T_k + T_i]$ seconds. $T_i$ represents an obstacle avoidance time of an ith vehicle, and 1=1~N. N is the total number of the leading vehicle 200 and the at least one following vehicle 300, and $T_0=0$. "i=1" corresponds to the leading vehicle 200, and "1=2~N" corresponds to the at least one following vehicle 300.

The step S022*f* is "Dynamically updating vehicle free space", and represents that configuring the cloud processing unit 410 to repeatedly perform the steps S022*a*, S022*b*, S022*c*, S022*d*, S022*e* to update the following distance, the first relative speed, the collision distance, the second relative speed and the third relative speed, and then dynamically update the leading vehicle free space and the at least one following vehicle free space according to the updated following distance, the updated first relative speed, the updated collision distance, the updated second relative speed and the updated third relative speed.

The allochronic obstacle avoidance deciding step S024 is "Does free space meet obstacle avoidance time/space conditions?", and represents that configuring the cloud processing unit 410 to decide the obstacle avoidance of the leading vehicle 200 and the at least one following vehicle 300 according to the leading vehicle free space and the at least one following vehicle free space. In other words, the allochronic obstacle avoidance deciding step S024 is performed to confirm whether the free spaces meet the obstacle avoidance time condition and an obstacle avoidance space condition. If yes, performing the trajectory speed planning step S03. If no, performing the vehicle platoon following instead of the obstacle avoidance. In addition, the allochronic obstacle avoidance deciding step S024 can further include "Obstacle moving direction/trajectory in t seconds in the future", and represents that predicting an obstacle movement intention result according to the obstacle position and the obstacle speed. The obstacle movement intention result corresponds to a moving direction and a moving trajectory of the obstacle in t seconds in the future. Therefore, the allochronic obstacle avoidance method 500 for platooning of the present disclosure utilizes the cloud to perform the free-space predicting step S022 and the allochronic obstacle avoidance deciding step S024, so that each of the at least one following vehicle 300 of the vehicle platoon dynamically adjusts the free space according to the relationship between each vehicle and the obstacle 110, and decides the obstacle avoidance of each vehicle according to the free space of each vehicle. The present disclosure can not only reduce the cost of equipment and the calculation amount of each of the at least one following vehicle processing unit 310, but also more safely and reasonably avoid the obstacle 110 to achieve a more intelligent autonomous mode.

Figure 4:
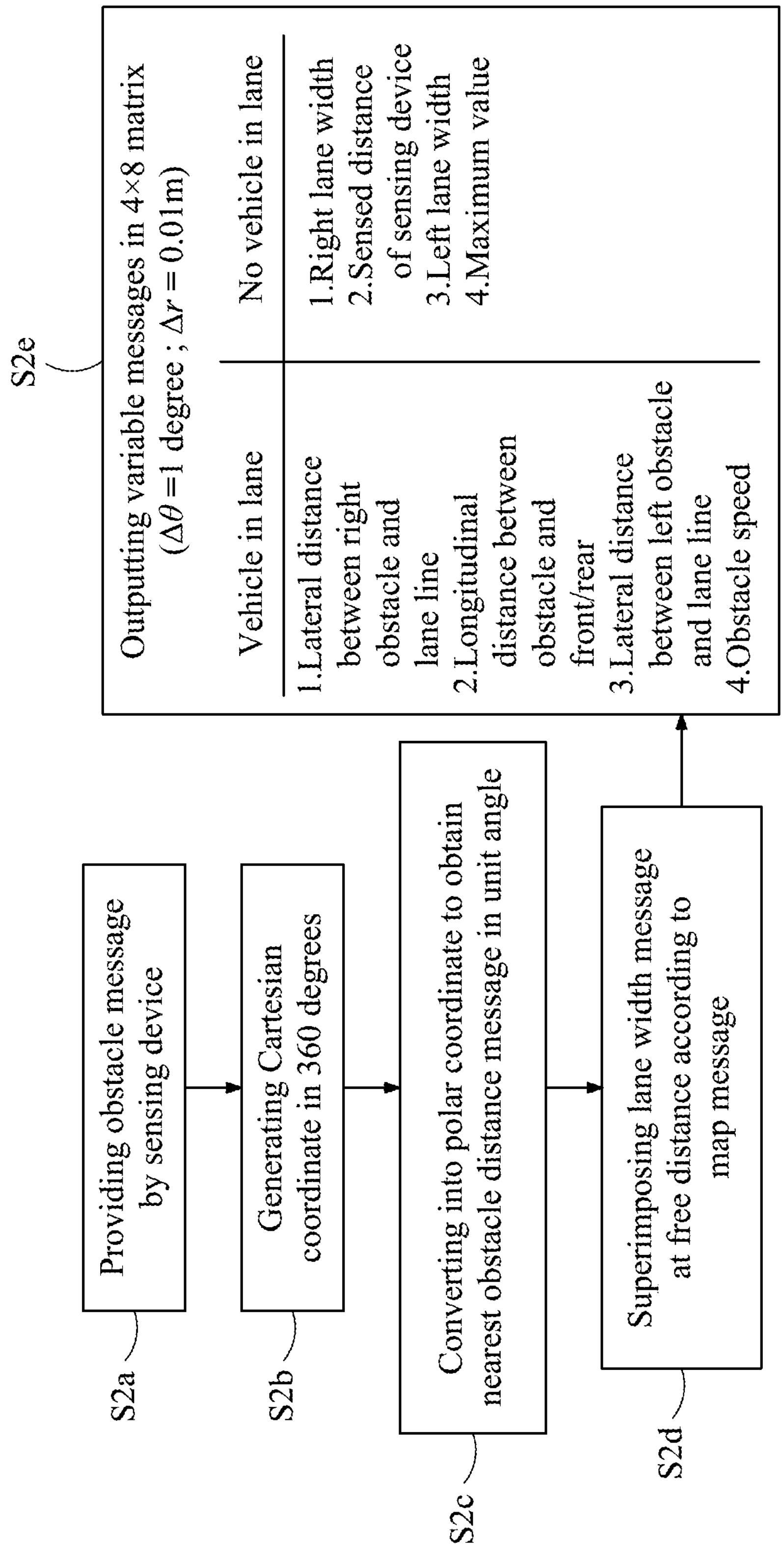
FIG. 4 shows a flow chart of a leading vehicle free-space predicting step of a cloud deciding step according to a third embodiment of the present disclosure.
Figure 5:
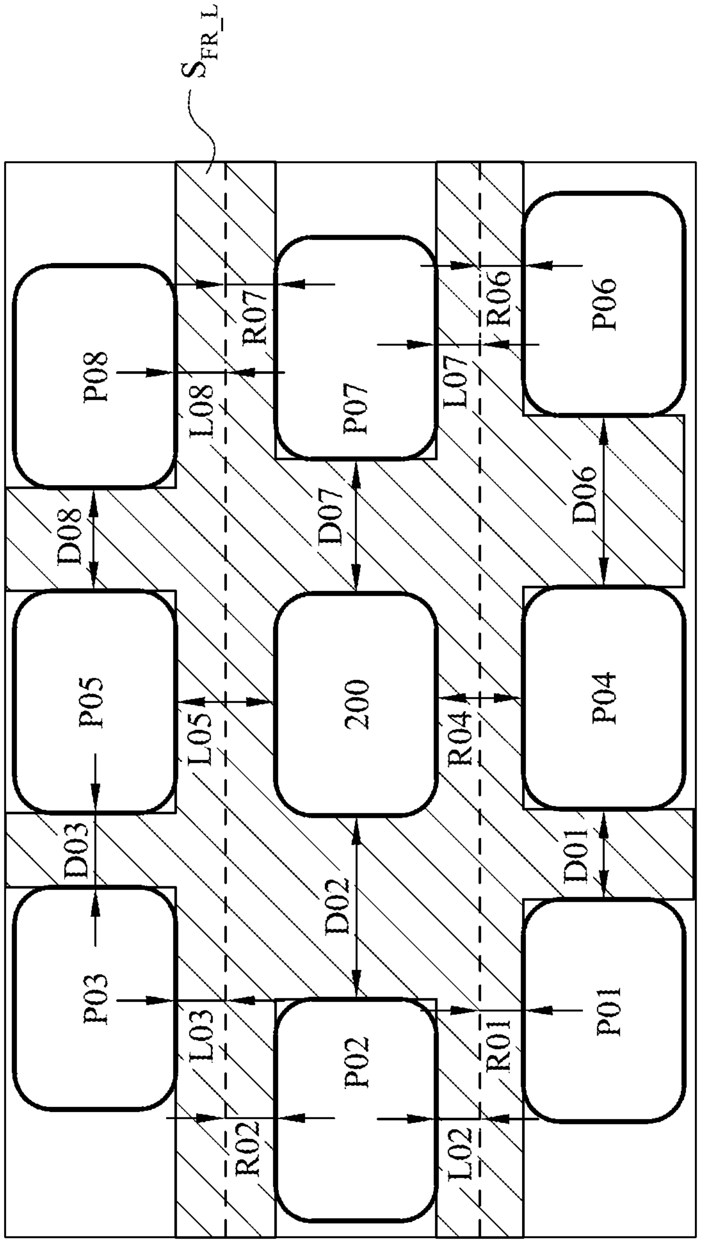
FIG. 5 shows a schematic view of relative positions of a leading vehicle and adjacent obstacles of the leading vehicle free-space predicting step of FIG. 4.

Please refer to FIGS. 1, 2, 4 and 5. FIG. 4 shows a flow chart of a leading vehicle free-space predicting step S1222 of a cloud deciding step S02 according to a third embodiment of the present disclosure. FIG. 5 shows a schematic view of relative positions of a leading vehicle 200 and adjacent obstacles 110 of the leading vehicle free-space predicting step S1222 of FIG. 4. The free-space predicting step S022 of the cloud deciding step S02 includes the leading vehicle free-space predicting step S1222. The leading vehicle free-space predicting step S1222 includes performing a plurality of steps S2*a*, S2*b*, S2*c*, S2*d*, S2*e*.

The step S2*a* is "Providing obstacle message by sensing device", and represents that configuring the sensing device 210 to rotate from 0 degrees to 360 degrees at a unit angle $\Delta\theta$ (angle resolution) to sense the obstacle 110 to obtain an obstacle message (e.g., the obstacle position and the obstacle speed). In one embodiment, the unit angle $\Delta\theta$ may be 1 degree, but the present disclosure is not limited thereto.

The step S2*b* is "Generating Cartesian coordinate in 360 degrees", and represents that configuring the cloud processing unit 410 to generate a Cartesian coordinate of the obstacle 110 relative to the leading vehicle position in 360 degrees according to the obstacle message.

The step S2*c* is "Converting into polar coordinate to obtain nearest obstacle distance message in unit angle", and represents that configuring the cloud processing unit 410 to convert the Cartesian coordinate into a polar coordinate. The polar coordinate includes a nearest obstacle distance message expressed in a unit distance $\Delta r$ (distance resolution). In one embodiment, the unit distance $\Delta r$ may be 0.01 m, but the present disclosure is not limited thereto.

The step S2*d* is "Superimposing lane width message at free distance according to map message", and represents that configuring the cloud processing unit 410 to predict the leading vehicle free space $S_{FR\_L}$ according to a map message and the nearest obstacle distance message. In other words, the cloud processing unit 410 is configured to obtain a lane width message and a free distance by the map message and the nearest obstacle distance message, and then superimpose the lane width message at the free distance according to the map message to predict the leading vehicle free space $S_{FR\_L}$.

Figure 7:
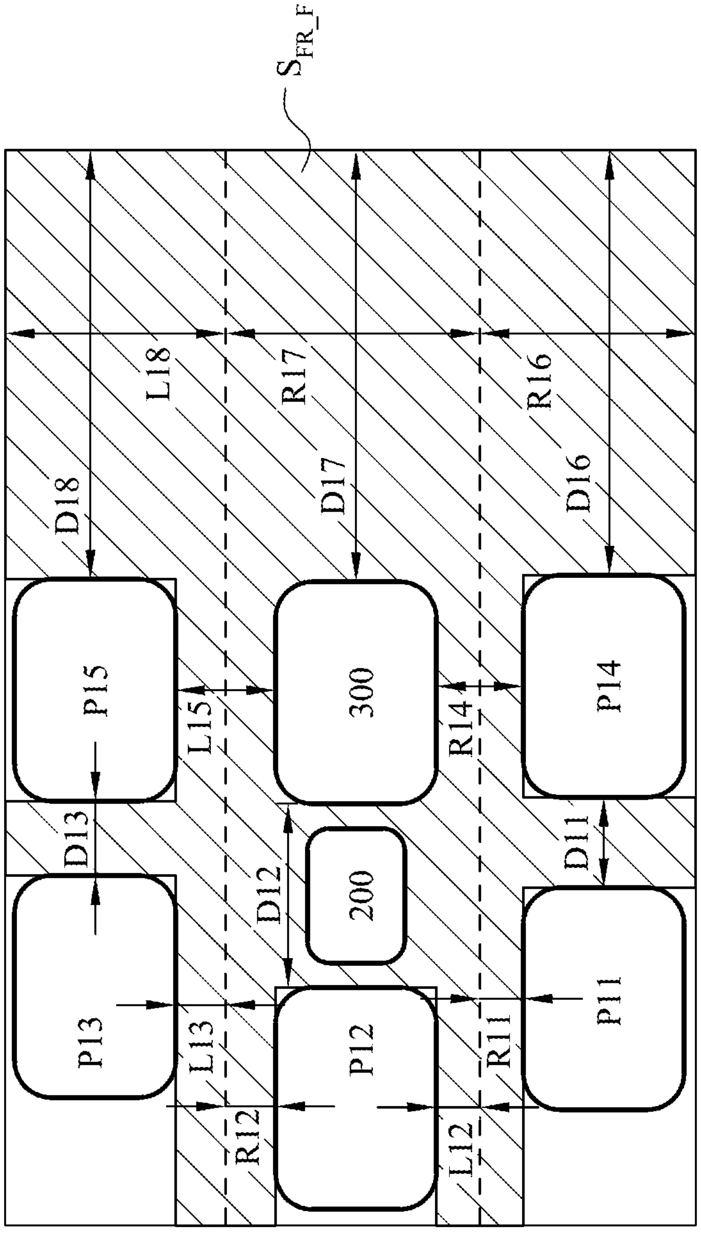
FIG. 7 shows a schematic view of relative positions of a following vehicle and adjacent obstacles of the following vehicle free-space predicting step of FIG. 6.

The step S2*e* is "Outputting variable messages in 4×8 matrix", and represents that configuring the cloud processing unit 410 to express the leading vehicle free space $S_{FR\_L}$ in a 4×8 matrix, and outputs the leading vehicle free space $S_{FR\_L}$ to the allochronic obstacle avoidance deciding step S024 for use. In detail, the leading vehicle free space $S_{FR\_L}$ includes a plurality of obstacle free positions and a plurality of variable messages corresponding to the obstacle free positions. The number of the obstacle free positions corresponds to "8" of "4×8". The obstacle free positions includes a left front obstacle position P01, a front obstacle position P02, a right front obstacle position P03, a left obstacle position P04, a right obstacle position P05, a left rear obstacle position P06, a rear obstacle position P07 and a right rear obstacle position P08. In addition, the variable messages include one of an obstacle position message (corresponding to "Vehicle in lane" in FIG. 4) and an obstacle-free position message (corresponding to "No vehicle in lane" in FIG. 4). The number of the variable messages corresponds to "4" of "4×8". The obstacle position message includes a lateral distance between a lane line and one of the right obstacle position P05, the right front obstacle position P03 and the right rear obstacle position P08 (the lateral distance corresponds to "Lateral distance between right obstacle and lane line" in FIG. 4), a longitudinal distance between one of the front obstacle position P02 and the rear obstacle position P07 and one of a front and a rear of the leading vehicle 200 (the longitudinal distance corresponds to "Longitudinal distance between obstacle and front/rear" in FIG. 4), another lateral distance between another lane line and one of the left obstacle position P04, the left front obstacle position P01 and the left rear obstacle position P06 (the lateral distance corresponds to "Lateral distance between left obstacle and lane line" in FIG. 4) and the obstacle speed. The obstacle-free position message includes a right lane width L18 (as shown in FIG. 7), a sensed distance of the sensing device 210, a left lane width R16 (as shown in FIG. 7) and a maximum value. The right lane width L18 and the left lane width R16 are provided by the lane road attributes, and the maximum value is a maximum of the obstacle speed for judging that there is no obstacle.

For example, in FIG. 5, the leading vehicle 200 is regarded as a reference. In the leading vehicle free space $S_{FR\_L}$, the variable messages corresponding to the obstacle free positions include the lateral distances L02, L03, L05, L07, L08 (Lateral distance between right obstacle and lane line), the longitudinal distances D01, D02, D03, D06, D07, D08 (Longitudinal distance between obstacle and front/rear), the lateral distances R01, R02, R04, R06, R07 (Lateral distance between left obstacle and lane line) and the obstacle speed. Therefore, the leading vehicle free-space predicting step S1222 of the present disclosure collects vehicle end messages via the cloud to predict and update the free space of each vehicle within a sensing range of the sensing device 210 of the leading vehicle 200 in real time.

Figure 6:
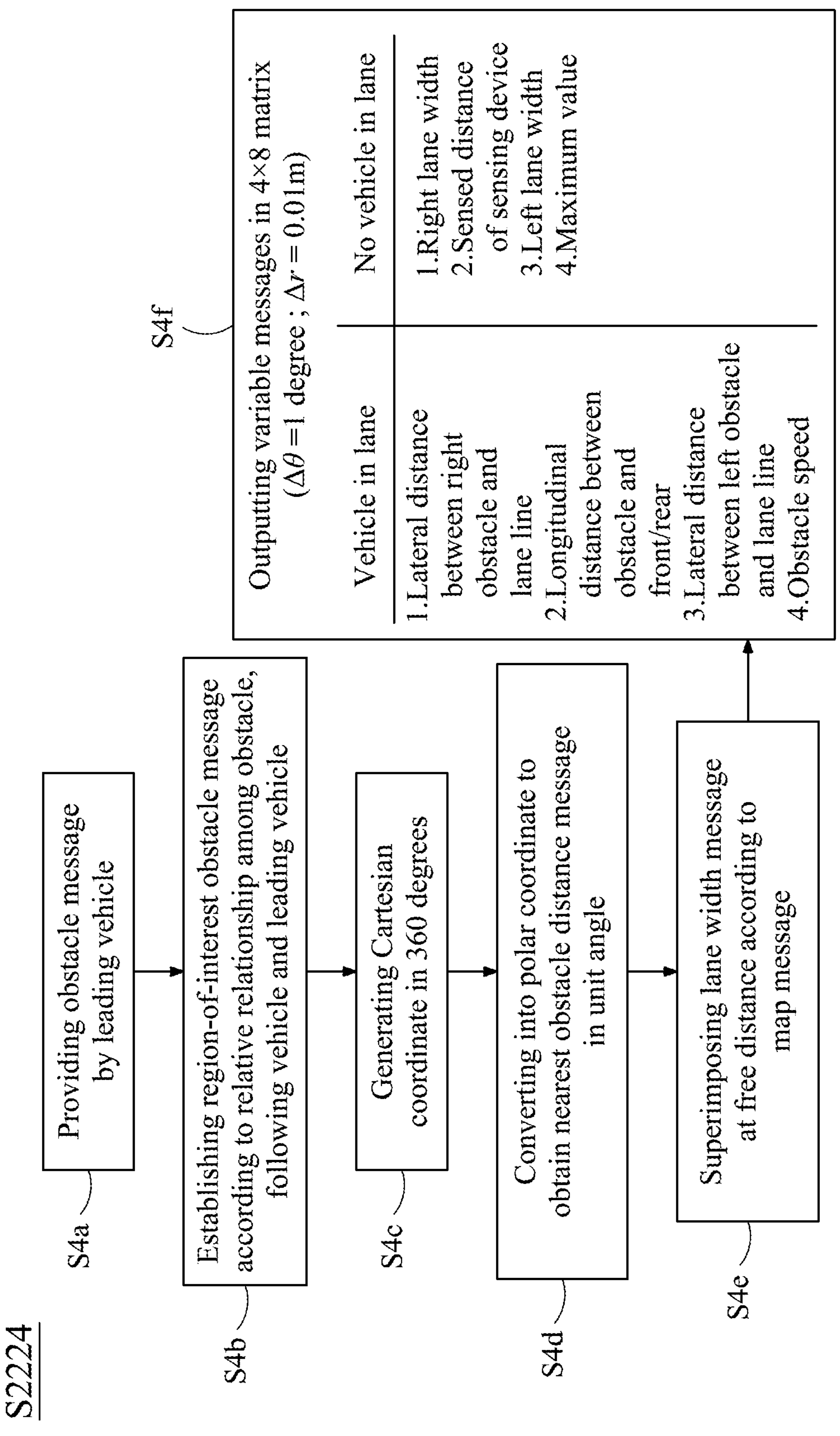
FIG. 6 shows a flow chart of a following vehicle free-space predicting step of a cloud deciding step according to a fourth embodiment of the present disclosure.

Please refer to FIGS. 1, 2, 6 and 7. FIG. 6 shows a flow chart of a following vehicle free-space predicting step S2224 of a cloud deciding step S02 according to a fourth embodiment of the present disclosure. FIG. 7 shows a schematic view of relative positions of a following vehicle 300 and adjacent obstacles 110 of the following vehicle free-space predicting step S2224 of FIG. 6. The free-space predicting step S022 of the cloud deciding step S02 includes the following vehicle free-space predicting step S2224. The following vehicle free-space predicting step S2224 includes performing a plurality of steps S4*a*, S4*b*, S4*c*, S4*d*, S4*e*, S4*f*.

The step S4*a* is "Providing obstacle message by leading vehicle", and represents that configuring the sensing device 210 disposed on the leading vehicle 200 to rotate from 0 degrees to 360 degrees at a unit angle Δθ (angle resolution) to sense the obstacle 110 to obtain an obstacle message (e.g., the obstacle position and the obstacle speed). In one embodiment, the unit angle Δθ may be 1 degree, but the present disclosure is not limited thereto.

The step S4*b* is "Establishing region-of-interest obstacle message according to relative relationship among obstacle, following vehicle and leading vehicle", and represents that configuring the cloud processing unit 410 to establish a region-of-interest obstacle message according to the leading vehicle position, the leading vehicle speed, the at least one following vehicle position, the at least one following vehicle speed and the obstacle message. The region-of-interest obstacle message corresponds to the at least one following vehicle position.

The step S4*c* is "Generating Cartesian coordinate in 360 degrees", and represents that configuring the cloud processing unit 410 to generate a Cartesian coordinate of the obstacle 110 relative to the at least one following vehicle position in 360 degrees according to the region-of-interest obstacle message.

The step S4*d* is the same as the step S2*c* of FIG. 4, and will not be described here again. The step S4*e* is "Superimposing lane width message at free distance according to map message", and represents that configuring the cloud processing unit 410 to predict the at least one following vehicle free space $S_{FR\_F}$ according to a map message and the nearest obstacle distance message. In other words, the cloud processing unit 410 is configured to obtain a lane width message and a free distance by the map message and the nearest obstacle distance message, and then superimpose the lane width message at the free distance according to the map message to predict the at least one following vehicle free space $S_{FR\_F}$. The step S4*f* is the same as the step S2*e* of FIG. 4, and will not be described here again.

For example, in FIG. 7, the following vehicle 300 is regarded as a reference. In the following vehicle free space $S_{FR\_F}$, the variable messages corresponding to the obstacle free positions include the lateral distances L12, L13, L15 (Lateral distance between right obstacle and lane line), the right lane width L18, the longitudinal distances D11, D12, D13 (Longitudinal distance between obstacle and front/rear), the longitudinal distances D16, D17, D18, the lateral distances R11, R12, R14 (Lateral distance between left obstacle and lane line), the left lane width R16, a lane width R17, the obstacle speed and the maximum value. The longitudinal distance D11 is a distance between a left front obstacle position P11 and a left obstacle position P14. The longitudinal distance D12 is a distance between a front obstacle position P12 and a front of the following vehicle 300. The longitudinal distance D13 is a distance between a right front obstacle position P13 and a right obstacle position P15. Therefore, the following vehicle free-space predicting step S2224 of the present disclosure collects vehicle end messages via the cloud to predict and update the free space of each vehicle within a sensing range of the sensing device 210 of the leading vehicle 200 in real time.

Figure 8:
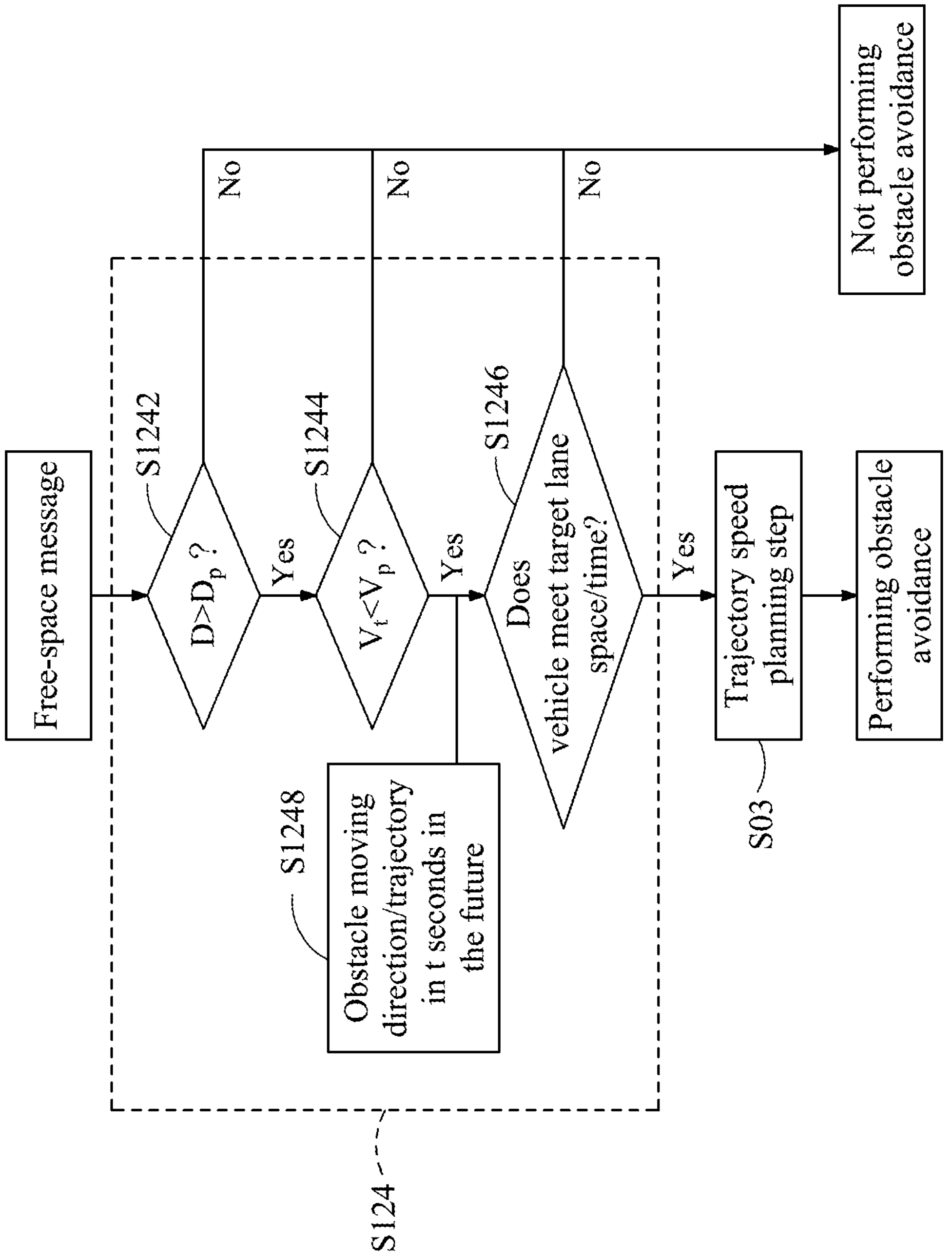
FIG. 8 shows a flow chart of an allochronic obstacle avoidance deciding step of a cloud deciding step of an allochronic obstacle avoidance system for platooning according to a fifth embodiment of the present disclosure.
Figure 9:
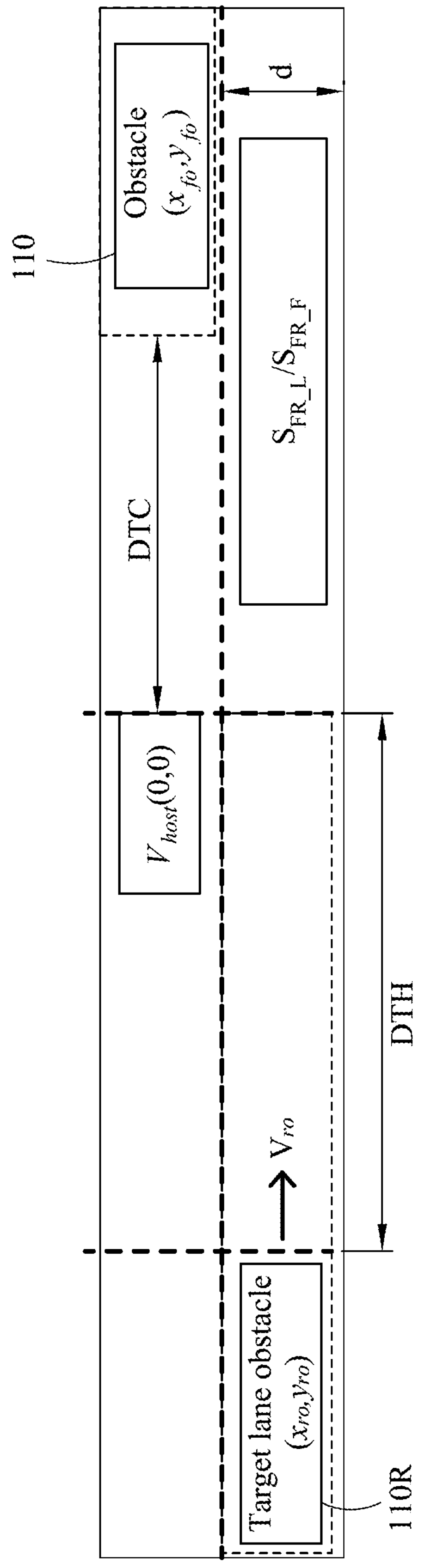
FIG. 9 shows a schematic view of a front distance and a rear distance of the allochronic obstacle avoidance deciding step of FIG. 8.

Please refer to FIGS. 1, 2, 8 and 9. FIG. 8 shows a flow chart of an allochronic obstacle avoidance deciding step S124 of a cloud deciding step S02 of an allochronic obstacle avoidance system 100 for platooning according to a fifth embodiment of the present disclosure. FIG. 9 shows a schematic view of a front distance DTC and a rear distance DTH of the allochronic obstacle avoidance deciding step S124 of FIG. 8. The allochronic obstacle avoidance deciding step S124 includes performing a sensed distance comparing step S1242, a speed comparing step S1244 and a free space confirming step S1246.

The sensed distance comparing step S1242 is "$D>D_P$?", and represents that comparing whether a sensed distance D of the sensing device 210 is greater than a vehicle platoon length $D_P$ to generate a sensed distance compared result. The vehicle platoon length $D_P$ considers a control delay, a positioning delay and communicating delay of the vehicle platoon. If yes, performing the speed comparing step S1244. If no, not performing the obstacle avoidance.

The speed comparing step S1244 is "$V_t<V_P$?", and represents that comparing whether the obstacle speed $V_t$ is smaller than the leading vehicle speed $V_P$ to generate a speed compared result. If yes, performing the free space confirming step S1246. If no, not performing the obstacle avoidance.

The free space confirming step S1246 is "Does vehicle meet target lane space/time?", and represents that confirming whether one of the leading vehicle 200 and the at least one following vehicle 300 meets a front distance condition and a rear distance condition of an obstacle avoidance space condition to generate a free space confirmed result. The front distance condition is that the front distance $DTC>\alpha V_i$. The rear distance condition is that the rear distance $DTH>\beta D_{safe-i}$. i is one of values from 1 to N, and α and β may be set to 3 and 1.5, respectively, but the present disclosure is not limited thereto. The front distance DTC represents a collision distance between a position (0,0) of one of the leading vehicle 200 and the at least one following vehicle 300 and a position $(x_{fo},y_{fo})$ of the obstacle 110. The obstacle 110 is located in front of the one of the leading vehicle 200 and the at least one following vehicle 300. The rear distance DTH represents a distance between a position $(x_{ro},y_{ro})$ of the target lane obstacle 110R and the position (0,0) of the one of the leading vehicle 200 and the at least one following vehicle 300. The target lane obstacle 110R is located in rear of the one of the leading vehicle 200 and the at least one following vehicle 300. The target lane obstacle 110R has a speed $V_{ro}$, and the target lane has a lane width d. $D_{safe-i}$ represents a safety distance of an ith vehicle and can be determined by an ith vehicle load, an ith vehicle speed, an environmental factor and a previous testing experience. $V_{host}$ represents a speed of the one of the leading vehicle 200 and the at least one following vehicle 300 at the position (0,0). $S_{FR\_L}$, $S_{FR\_F}$ represent the leading vehicle free space and the following vehicle free space, respectively. The cloud processing unit 410 is configured to decide the obstacle avoidance of the leading vehicle 200 and the at least one following vehicle 300 according to the sensed distance compared result, the speed compared result and the free space confirmed result.

In addition, the allochronic obstacle avoidance deciding step S124 further includes performing an obstacle movement intention predicting step S1248. The obstacle movement intention predicting step S1248 is "Obstacle moving direction/trajectory in t seconds in the future", and represents that predicting an obstacle movement intention result according to the obstacle position and the obstacle speed. The obstacle movement intention result corresponds to a moving direction and a moving trajectory of the obstacle (each of the obstacle 110 and the target lane obstacle 110R) in t seconds in the future. The obstacle movement intention predicting step S1248 is performed between the speed comparing step S1244 and the free space confirming step S1246, and the free space confirming step S1246 is performed according to the obstacle movement intention result of the obstacle movement intention predicting step S1248. In other words, the cloud processing unit 410 is configured to decide the obstacle avoidance of the leading vehicle 200 and the at least one following vehicle 300 according to the sensed distance compared result, the speed compared result, the free space confirmed result and the obstacle movement intention result. Therefore, the allochronic obstacle avoidance deciding step S124 of the present disclosure decides the allochronic obstacle avoidance command via the cloud and considers the obstacle movement intention at the same time, so that the vehicle platoon may more safely and reasonably avoid the obstacle to achieve a more intelligent autonomous mode.

Figure 10:
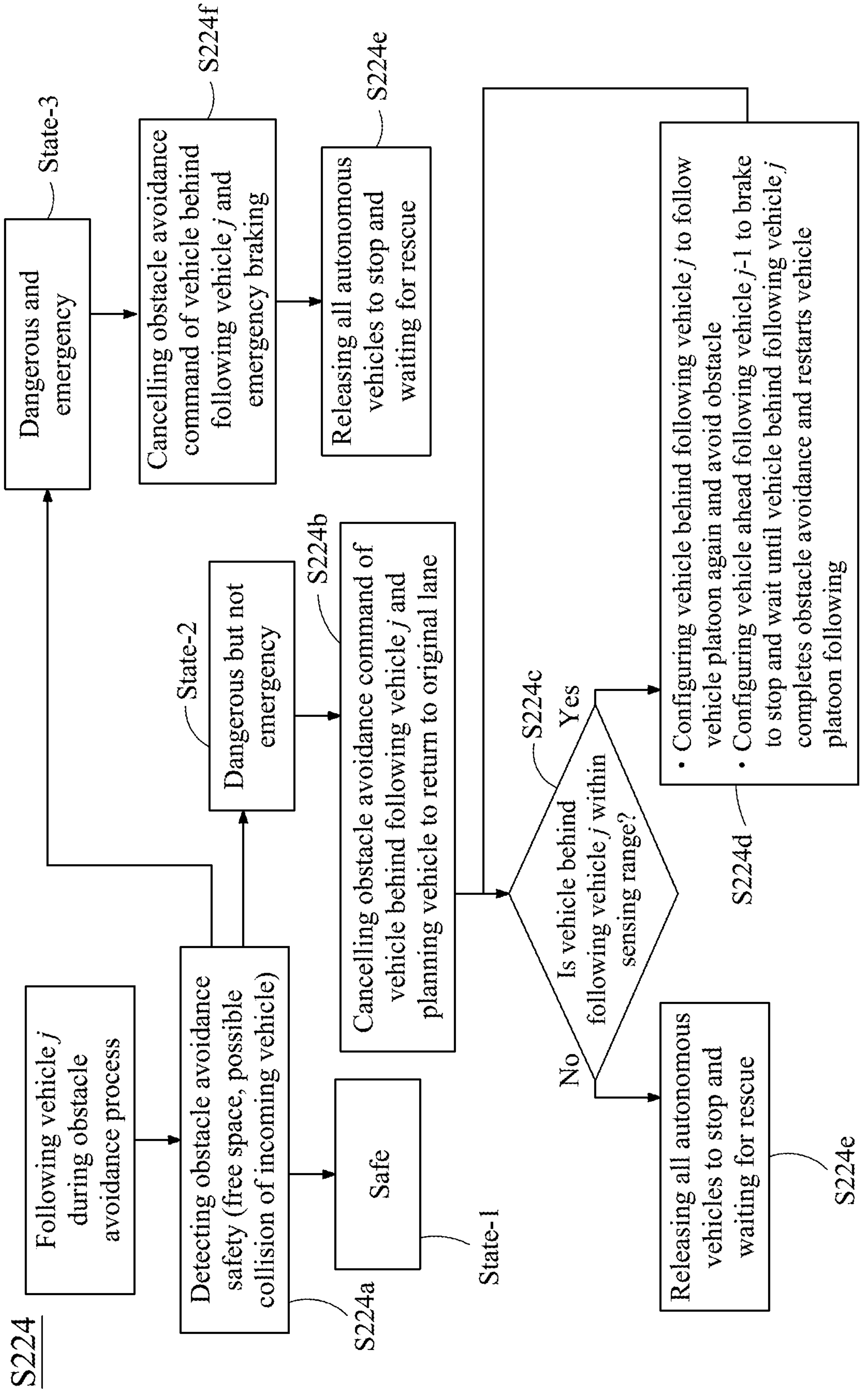
FIG. 10 shows a flow chart of an allochronic obstacle avoidance deciding step of a cloud deciding step of an allochronic obstacle avoidance system for platooning according to a sixth embodiment of the present disclosure.

Please refer to FIGS. 1, 2, 3 and 10. FIG. 10 shows a flow chart of an allochronic obstacle avoidance deciding step S224 of a cloud deciding step S02 of an allochronic obstacle avoidance system 100 for platooning according to a sixth embodiment of the present disclosure. The allochronic obstacle avoidance deciding step S224 is a decision of the following vehicle j of the vehicle platoon when the following vehicle j is disturbed during obstacle avoidance process and fails to follow the vehicle platoon. The allochronic obstacle avoidance deciding step S224 includes an obstacle avoidance safety confirming step S224*a*, an obstacle avoidance cancellation vehicle returning step S224*b*, a sense confirming step S224*c*, a vehicle platoon restarting step S224*d*, a vehicle platoon stopping step S224*e* and an obstacle avoidance cancellation emergency braking step S224*f*.

The obstacle avoidance safety confirming step S224*a* is "Detecting obstacle avoidance safety (free space, possible collision of incoming vehicle)", and represents that configuring the cloud processing unit 410 to confirm whether the at least one following vehicle free space and a collision distance between the at least one following vehicle 300 and the obstacle 110 meet an obstacle avoidance safety condition to generate a safety confirmed result. In detail, the obstacle avoidance safety condition includes a predetermined safe space and a predetermined collision distance. In response to determining that the at least one following vehicle free space and the collision distance both meet the obstacle avoidance safety condition, the safety confirmed result is a first state State-1. In other words, in response to determining that the at least one following vehicle free space is greater than or equal to the predetermined safe space and the collision distance is greater than or equal to the predetermined collision distance, the safety confirmed result is "safe". In addition, in response to determining that a part of the at least one following vehicle free space and the collision distance meets the obstacle avoidance safety condition, the safety confirmed result is a second state State-2. The at least one following vehicle processing unit 310 is configured to perform the obstacle avoidance cancellation vehicle returning step S224*b*. In other words, in response to determining that the at least one following vehicle free space is smaller than the predetermined safe space and the collision distance is greater than or equal to the predetermined collision distance, the safety confirmed result is "Dangerous but not emergency". Moreover, in response to determining that the at least one following vehicle free space and the collision distance do not meet the obstacle avoidance safety condition, the safety confirmed result is a third state State-3, and the at least one following vehicle processing unit 310 is configured to perform the obstacle avoidance cancellation emergency braking step S224*f* to stop the vehicle platoon. In other words, in response to determining that the at least one following vehicle free space is smaller than the predetermined safe space and the collision distance is smaller than the predetermined collision distance, the safety confirmed result is "Dangerous and emergency".

The obstacle avoidance cancellation vehicle returning step S224*b* is "Cancelling obstacle avoidance command of vehicle behind following vehicle j and planning vehicle to return to original lane", and represents that configuring the cloud processing unit 410 to cancel the obstacle avoidance of vehicles from the following vehicle j to the following vehicle N−1 and plan the vehicles from the following vehicle j to the following vehicle N−1 to return to an original lane. j is one of values from 1 to N−1, and the at least one following vehicle 300 is composed of the vehicles from the following vehicle 1 to the following vehicle N−1.

The sense confirming step S224*c* is "Is vehicle behind following vehicle j within sensing range?", and represents that configuring the cloud processing unit 410 to determine whether to stop the vehicle platoon according to a longitudinal distance between the leading vehicle 200 and the at least one following vehicle 300 and a sensed distance of the sensing device 210. In other words, the cloud processing unit 410 is configured to confirm whether the vehicles from the following vehicle j to the following vehicle N−1 are all within the sensed distance of the sensing device 210. If yes, performing the vehicle platoon restarting step S224*d*. If no, performing the vehicle platoon stopping step S224*e*.

The vehicle platoon restarting step S224*d* is "Configuring vehicle behind following vehicle j to follow vehicle platoon again and avoid obstacle" and "Configuring vehicle ahead following vehicle j−1 to brake to stop and wait until vehicle behind following vehicle j completes obstacle avoidance and restarts vehicle platoon following", and represents that configuring the cloud processing unit 410 to drive the vehicles from the following vehicle j to the following vehicle N−1 to follow the vehicle platoon again and avoid obstacle, and control the leading vehicle 200 and the vehicles from the following vehicle 1 to the following vehicle j−1 to brake to stop and wait the vehicles from the following vehicle j to the following vehicle N−1. When the vehicles from the following vehicle j to the following vehicle N−1 complete the obstacle avoidance, restarting the vehicle platoon following.

The vehicle platoon stopping step S224*e* is "Releasing all autonomous vehicles to stop and waiting for rescue", and represents that configuring the cloud processing unit 410 to control the leading vehicle 200 and all the following vehicle 300 to stop and waiting for rescue, i.e., stopping the vehicle platoon.

The obstacle avoidance cancellation emergency braking step S224*f* is "Cancelling obstacle avoidance command of vehicle behind following vehicle j and emergency braking", and represents that configuring the cloud processing unit 410 to cancel the obstacle avoidance of the vehicles from the following vehicle j to the following vehicle N−1 and control the leading vehicle 200 and all the following vehicle 300 to brake to stop. Therefore, the present disclosure can utilize the allochronic obstacle avoidance deciding step S224 to implement the decision of the following vehicle j of the vehicle platoon when the following vehicle j is disturbed during obstacle avoidance process and fails to follow the vehicle platoon. In addition, the allochronic obstacle avoidance deciding step S224 can use adaptive control according to different levels of the safety confirmed results to achieve a more intelligent autonomous mode.

In other embodiment, the obstacle avoidance safety confirming step S224*a* includes configuring the cloud processing unit 410 to confirm whether a collision time between the at least one following vehicle 300 and the obstacle 110 meets another obstacle avoidance safety condition to generate another safety confirmed result. The another obstacle avoidance safety condition includes a first predetermined collision time and a second predetermined collision time. The first predetermined collision time is smaller than the second predetermined collision time. In response to determining that the collision time is greater than or equal to the second predetermined collision time, the another safety confirmed result is "safe". In response to determining that the collision time is greater than or equal to the first predetermined collision time and smaller than the second predetermined collision time, the another safety confirmed result is "Dangerous but not emergency". In response to determining that the collision time is smaller than the first predetermined collision time, the another safety confirmed result is "Dangerous and emergency", and the present disclosure is not limited thereto.

According to the aforementioned embodiments and examples, the advantages of the present disclosure are described as follows.

1. The allochronic obstacle avoidance system for platooning and a method thereof of the present disclosure utilize the cloud to perform the free-space predicting step and the allochronic obstacle avoidance deciding step, so that each of the at least one following vehicle of the vehicle platoon dynamically adjusts the free space according to the relationship between each vehicle and the obstacle, and decides the obstacle avoidance of each vehicle according to the free space of each vehicle. Accordingly, the present disclosure can not only reduce the cost of equipment and the calculation amount of each of the at least one following vehicle processing unit, but also more safely and reasonably avoid the obstacle to achieve a more intelligent autonomous mode. Moreover, the present disclosure can avoid the problems of high cost, excessive calculation amount, no message sharing and the need of the obstacle avoidances of multiple vehicles at the same time of a conventional technology.

2. The leading vehicle free-space predicting step and the following vehicle free-space predicting step of the present disclosure collect vehicle end messages via the cloud to predict and update the free space of each vehicle within a sensing range of the sensing device of the leading vehicle in real time.

3. The allochronic obstacle avoidance deciding step of the present disclosure can decide the allochronic obstacle avoidance command via the cloud and consider the obstacle movement intention at the same time, so that the vehicle platoon can more safely and reasonably avoid the obstacle.

4. The present disclosure can utilize the allochronic obstacle avoidance deciding step to implement the decision of the following vehicle of the vehicle platoon when the following vehicle is disturbed during obstacle avoidance process and fails to follow the vehicle platoon. In addition, the allochronic obstacle avoidance deciding step can use adaptive control according to different levels of the safety confirmed results to achieve a more intelligent autonomous mode.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An allochronic obstacle avoidance system for platooning, which is configured to decide an obstacle avoidance of a leading vehicle and at least one following vehicle, the allochronic obstacle avoidance system for platooning comprising:

a sensing device disposed on the leading vehicle and configured to sense an obstacle in a surrounding environment of the leading vehicle to generate an obstacle position and an obstacle speed, wherein the at least one following vehicle is not equipped with any other sensing device;

a leading vehicle processing unit disposed on the leading vehicle and signally connected to the sensing device, wherein the leading vehicle processing unit is configured to transmit a leading vehicle parameter group comprising the obstacle position, the obstacle speed, a leading vehicle position and a leading vehicle speed;

at least one following vehicle processing unit disposed on the at least one following vehicle and configured to transmit at least one following vehicle parameter group comprising at least one following vehicle position and at least one following vehicle speed; and a cloud processing unit signally connected to the leading vehicle processing unit and the at least one following vehicle processing unit, and receiving the leading vehicle parameter group and the at least one following vehicle parameter group, wherein the cloud processing unit is configured to implement a cloud deciding step comprising:

performing a free-space predicting step to predict a leading vehicle free space and at least one following vehicle free space according to the leading vehicle parameter group and the at least one following vehicle parameter group; and performing an allochronic obstacle avoidance deciding step to decide the obstacle avoidance of the leading vehicle and the at least one following vehicle according to the leading vehicle free space and the at least one following vehicle free space;

wherein the free-space predicting step comprises:

performing a following vehicle free-space predicting step comprising:

configuring the sensing device to rotate from 0 degrees to 360 degrees at a unit angle to sense the obstacle to obtain an obstacle message;

configuring the cloud processing unit to establish a region-of-interest obstacle message according to the leading vehicle position, the leading vehicle speed, the at least one following vehicle position, the at least one following vehicle speed and the obstacle message, wherein the region-of-interest obstacle message corresponds to the at least one following vehicle position;

configuring the cloud processing unit to generate a Cartesian coordinate of the obstacle relative to the at least one following vehicle position in 360 degrees according to the region-of-interest obstacle message;

configuring the cloud processing unit to convert the Cartesian coordinate into a polar coordinate, wherein the polar coordinate comprises a nearest obstacle distance message; and configuring the cloud processing unit to predict the at least one following vehicle free space according to a map message and the nearest obstacle distance message, wherein the cloud processing unit obtains a lane width message and a free distance by the map message and the nearest obstacle distance message, and then superimposes the lane width message at the free distance according to the map message to predict the at least one following vehicle free space.

2. The allochronic obstacle avoidance system for platooning of claim 1, further comprising:

a leading vehicle positioning device disposed on the leading vehicle and signally connected to the leading vehicle processing unit, wherein the leading vehicle positioning device is configured to position the leading vehicle to generate the leading vehicle position; and at least one following vehicle positioning device disposed on the at least one following vehicle and signally connected to the at least one following vehicle processing unit, wherein the at least one following vehicle positioning device is configured to position the at least one following vehicle to generate the at least one following vehicle position;

wherein the leading vehicle parameter group further comprises the leading vehicle position, and the at least one following vehicle parameter group further comprises the at least one following vehicle position.

3. The allochronic obstacle avoidance system for platooning of claim 1, further comprising:

a leading vehicle communicating device disposed on the leading vehicle and signally connected to the leading vehicle processing unit, wherein the leading vehicle communicating device is configured to generate a leading vehicle driving parameter; and at least one following vehicle communicating device disposed on the at least one following vehicle and signally connected to the at least one following vehicle processing unit, wherein the at least one following vehicle communicating device is configured to generate at least one following vehicle driving parameter;

wherein the leading vehicle parameter group further comprises the leading vehicle driving parameter, and the at least one following vehicle parameter group further comprises the at least one following vehicle driving parameter.

4. The allochronic obstacle avoidance system for platooning of claim 1, wherein the free-space predicting step comprises:

configuring the cloud processing unit to calculate a following distance and a first relative speed between the at least one following vehicle and another following vehicle adjacent to the at least one following vehicle according to the leading vehicle position, the leading vehicle speed, the at least one following vehicle position, the at least one following vehicle speed and a current lane identification;

configuring the cloud processing unit to calculate a collision distance and a second relative speed between the at least one following vehicle and the obstacle according to the obstacle position, the obstacle speed, the following distance and the first relative speed;

configuring the sensing device to sense a target lane obstacle in a surrounding environment of the at least one following vehicle to generate another obstacle position and another obstacle speed, and then configuring the cloud processing unit to calculate a third relative speed between the at least one following vehicle and the target lane obstacle according to the another obstacle position and the another obstacle speed; and configuring the cloud processing unit to predict the leading vehicle free space and the at least one following vehicle free space according to the following distance, the first relative speed, the collision distance, the second relative speed and the third relative speed.

5. The allochronic obstacle avoidance system for platooning of claim 1, wherein the free-space predicting step comprises:

performing a leading vehicle free-space predicting step comprising:

configuring the sensing device to rotate from 0 degrees to 360 degrees at the unit angle to sense the obstacle to generate a Cartesian coordinate of the obstacle relative to the leading vehicle position;

configuring the cloud processing unit to convert the Cartesian coordinate of the obstacle relative to the leading vehicle position into another polar coordinate, wherein the another polar coordinate comprises another nearest obstacle distance message; and configuring the cloud processing unit to predict the leading vehicle free space according to the map message and the another nearest obstacle distance message.

6. The allochronic obstacle avoidance system for platooning of claim 5, wherein, the leading vehicle free space comprises a plurality of obstacle free positions and a plurality of variable messages corresponding to the obstacle free positions;

the obstacle free positions comprises a left front obstacle position, a front obstacle position, a right front obstacle position, a left obstacle position, a right obstacle position, a left rear obstacle position, a rear obstacle position and a right rear obstacle position; and the variable messages comprises one of an obstacle position message and an obstacle-free position message, the obstacle position message comprises a lateral distance between a lane line and one of the right obstacle position, the right front obstacle position and the right rear obstacle position, a longitudinal distance between one of the front obstacle position and the rear obstacle position and one of a front and a rear of the leading vehicle, another lateral distance between another lane line and one of the left obstacle position, the left front obstacle position and the left rear obstacle position and the obstacle speed, and the obstacle-free position message comprises a right lane width, a sensed distance of the sensing device, a left lane width and a maximum value.

7. The allochronic obstacle avoidance system for platooning of claim 1, wherein, the at least one following vehicle free space comprises a plurality of obstacle free positions and a plurality of variable messages corresponding to the obstacle free positions;

the obstacle free positions comprises a left front obstacle position, a front obstacle position, a right front obstacle position, a left obstacle position, a right obstacle position, a left rear obstacle position, a rear obstacle position and a right rear obstacle position; and the variable messages comprises one of an obstacle position message and an obstacle-free position message, the obstacle position message comprises a lateral distance between a lane line and one of the right obstacle position, the right front obstacle position and the right rear obstacle position, a longitudinal distance between one of the front obstacle position and the rear obstacle position and one of a front and a rear of the leading vehicle, another lateral distance between another lane line and one of the left obstacle position, the left front obstacle position and the left rear obstacle position and the obstacle speed, and the obstacle-free position message comprises a right lane width, a sensed distance of the sensing device, a left lane width and a maximum value.

8. The allochronic obstacle avoidance system for platooning of claim 1, wherein the allochronic obstacle avoidance deciding step comprises:

performing a sensed distance comparing step to compare whether a sensed distance of the sensing device is greater than a vehicle platoon length to generate a sensed distance compared result;

performing a speed comparing step to compare whether the obstacle speed is smaller than the leading vehicle speed to generate a speed compared result; and performing a free space confirming step to confirm whether one of the leading vehicle and the at least one following vehicle meets a front distance condition and a rear distance condition to generate a free space confirmed result;

wherein the cloud processing unit is configured to decide the obstacle avoidance of the leading vehicle and the at least one following vehicle according to the sensed distance compared result, the speed compared result and the free space confirmed result.

9. The allochronic obstacle avoidance system for platooning of claim 8, wherein the allochronic obstacle avoidance deciding step further comprises:

performing an obstacle movement intention predicting step to predict an obstacle movement intention result according to the obstacle position and the obstacle speed;

wherein the obstacle movement intention predicting step is performed between the speed comparing step and the free space confirming step, and the free space confirming step is performed according to the obstacle movement intention result.

10. The allochronic obstacle avoidance system for platooning of claim 1, wherein the allochronic obstacle avoidance deciding step comprises:

performing an obstacle avoidance safety confirming step to configure the cloud processing unit to confirm whether the at least one following vehicle free space and a collision distance between the at least one following vehicle and the obstacle meet an obstacle avoidance safety condition to generate a safety confirmed result;

wherein in response to determining that the at least one following vehicle free space and the collision distance both meet the obstacle avoidance safety condition, the safety confirmed result is a first state;

wherein in response to determining that a part of the at least one following vehicle free space and the collision distance meets the obstacle avoidance safety condition, the safety confirmed result is a second state, the at least one following vehicle processing unit is configured to perform an obstacle avoidance cancellation vehicle returning step, and the at least one following vehicle processing unit is configured to determine whether to stop a vehicle platoon according to a longitudinal distance between the leading vehicle and the at least one following vehicle and a sensed distance of the sensing device;

wherein in response to determining that the at least one following vehicle free space and the collision distance do not meet the obstacle avoidance safety condition, the safety confirmed result is a third state, and the at least one following vehicle processing unit is configured to perform an obstacle avoidance cancellation emergency braking step to stop the vehicle platoon.

11. An allochronic obstacle avoidance method for platooning, which is configured to decide an obstacle avoidance of a leading vehicle and at least one following vehicle, the allochronic obstacle avoidance method for platooning comprising:

performing a cloud deciding step comprising:

performing a free-space predicting step to configure a cloud processing unit of an allochronic obstacle avoidance system to predict a leading vehicle free space and at least one following vehicle free space according to a leading vehicle parameter group and at least one following vehicle parameter group; and performing an allochronic obstacle avoidance deciding step to configure the cloud processing unit to decide the obstacle avoidance of the leading vehicle and the at least one following vehicle according to the leading vehicle free space and the at least one following vehicle free space;

wherein the cloud processing unit is signally connected to a leading vehicle processing unit and at least one following vehicle processing unit of the allochronic obstacle avoidance system and receives the leading vehicle parameter group and the at least one following vehicle parameter group, the leading vehicle processing unit is signally connected to a sensing device of the allochronic obstacle avoidance system, the leading vehicle processing unit and the sensing device are disposed on the leading vehicle, the at least one following vehicle is not equipped with any other sensing device, the sensing device is configured to sense an obstacle in a surrounding environment of the leading vehicle to generate an obstacle position and an obstacle speed, the leading vehicle processing unit is configured to transmit the leading vehicle parameter group comprising the obstacle position, the obstacle speed, a leading vehicle position and a leading vehicle speed, the at least one following vehicle processing unit is disposed on the at least one following vehicle and configured to transmit the at least one following vehicle parameter group comprising at least one following vehicle position and at least one following vehicle speed;

wherein the free-space predicting step comprises:

performing a following vehicle free-space predicting step comprising:

configuring the sensing device to rotate from 0 degrees to 360 degrees at a unit angle to sense the obstacle to obtain an obstacle message;

configuring the cloud processing unit to establish a region-of-interest obstacle message according to the leading vehicle position, the leading vehicle speed, the at least one following vehicle position, the at least one following vehicle speed and the obstacle message, wherein the region-of-interest obstacle message corresponds to the at least one following vehicle position;

configuring the cloud processing unit to generate a Cartesian coordinate of the obstacle relative to the at least one following vehicle position in 360 degrees according to the region-of-interest obstacle message;

configuring the cloud processing unit to convert the Cartesian coordinate into a polar coordinate, wherein the polar coordinate comprises a nearest obstacle distance message; and configuring the cloud processing unit to predict the at least one following vehicle free space according to a map message and the nearest obstacle distance message, wherein the cloud processing unit obtains a lane width message and a free distance by the map message and the nearest obstacle distance message, and then superimposes the lane width message at the free distance according to the map message to predict the at least one following vehicle free space.

12. The allochronic obstacle avoidance method for platooning of claim 11, wherein the free-space predicting step comprises:

configuring the cloud processing unit to calculate a following distance and a first relative speed between the at least one following vehicle and another following vehicle adjacent to the at least one following vehicle according to the leading vehicle position, the leading vehicle speed, the at least one following vehicle position, the at least one following vehicle speed and a current lane identification;

configuring the cloud processing unit to calculate a collision distance and a second relative speed between the at least one following vehicle and the obstacle according to the obstacle position, the obstacle speed, the following distance and the first relative speed;

configuring the sensing device to sense a target lane obstacle in a surrounding environment of the at least one following vehicle to generate another obstacle position and another obstacle speed, and then configuring the cloud processing unit to calculate a third relative speed between the at least one following vehicle and the target lane obstacle according to the another obstacle position and the another obstacle speed; and configuring the cloud processing unit to predict the leading vehicle free space and the at least one following vehicle free space according to the following distance, the first relative speed, the collision distance, the second relative speed and the third relative speed.

13. The allochronic obstacle avoidance method for platooning of claim 11, wherein the free-space predicting step comprises:

performing a leading vehicle free-space predicting step comprising:

configuring the sensing device to rotate from 0 degrees to 360 degrees at the unit angle to sense the obstacle to generate a Cartesian coordinate of the obstacle relative to the leading vehicle position;

configuring the cloud processing unit to convert the Cartesian coordinate of the obstacle relative to the leading vehicle position into another polar coordinate, wherein the another polar coordinate comprises another nearest obstacle distance message; and configuring the cloud processing unit to predict the leading vehicle free space according to the map message and the another nearest obstacle distance message.

14. The allochronic obstacle avoidance method for platooning of claim 13, wherein, the leading vehicle free space comprises a plurality of obstacle free positions and a plurality of variable messages corresponding to the obstacle free positions;

the obstacle free positions comprises a left front obstacle position, a front obstacle position, a right front obstacle position, a left obstacle position, a right obstacle position, a left rear obstacle position, a rear obstacle position and a right rear obstacle position; and the variable messages comprises one of an obstacle position message and an obstacle-free position message, the obstacle position message comprises a lateral distance between a lane line and one of the right obstacle position, the right front obstacle position and the right rear obstacle position, a longitudinal distance between one of the front obstacle position and the rear obstacle position and one of a front and a rear of the leading vehicle, another lateral distance between another lane line and one of the left obstacle position, the left front obstacle position and the left rear obstacle position and the obstacle speed, and the obstacle-free position message comprises a right lane width, a sensed distance of the sensing device, a left lane width and a maximum value.

15. The allochronic obstacle avoidance method for platooning of claim 11, wherein, the at least one following vehicle free space comprises a plurality of obstacle free positions and a plurality of variable messages corresponding to the obstacle free positions;

the obstacle free positions comprises a left front obstacle position, a front obstacle position, a right front obstacle position, a left obstacle position, a right obstacle position, a left rear obstacle position, a rear obstacle position and a right rear obstacle position; and the variable messages comprises one of an obstacle position message and an obstacle-free position message, the obstacle position message comprises a lateral distance between a lane line and one of the right obstacle position, the right front obstacle position and the right rear obstacle position, a longitudinal distance between one of the front obstacle position and the rear obstacle position and one of a front and a rear of the leading vehicle, another lateral distance between another lane line and one of the left obstacle position, the left front obstacle position and the left rear obstacle position and the obstacle speed, and the obstacle-free position message comprises a right lane width, a sensed distance of the sensing device, a left lane width and a maximum value.

16. The allochronic obstacle avoidance method for platooning of claim 11, wherein the allochronic obstacle avoidance deciding step comprises:

performing a sensed distance comparing step to compare whether a sensed distance of the sensing device is greater than a vehicle platoon length to generate a sensed distance compared result;

performing a speed comparing step to compare whether the obstacle speed is smaller than the leading vehicle speed to generate a speed compared result; and performing a free space confirming step to confirm whether one of the leading vehicle and the at least one following vehicle meets a front distance condition and a rear distance condition to generate a free space confirmed result;

wherein the cloud processing unit is configured to decide the obstacle avoidance of the leading vehicle and the at least one following vehicle according to the sensed distance compared result, the speed compared result and the free space confirmed result.

17. The allochronic obstacle avoidance method for platooning of claim 16, wherein the allochronic obstacle avoidance deciding step further comprises:

performing an obstacle movement intention predicting step to predict an obstacle movement intention result according to the obstacle position and the obstacle speed;

wherein the obstacle movement intention predicting step is performed between the speed comparing step and the free space confirming step, and the free space confirming step is performed according to the obstacle movement intention result.

18. The allochronic obstacle avoidance method for platooning of claim 11, wherein the allochronic obstacle avoidance deciding step comprises:

performing an obstacle avoidance safety confirming step to configure the cloud processing unit to confirm whether the at least one following vehicle free space and a collision distance between the at least one following vehicle and the obstacle meet an obstacle avoidance safety condition to generate a safety confirmed result;

wherein in response to determining that the at least one following vehicle free space and the collision distance both meet the obstacle avoidance safety condition, the safety confirmed result is a first state;

wherein in response to determining that a part of the at least one following vehicle free space and the collision distance meets the obstacle avoidance safety condition, the safety confirmed result is a second state, the at least one following vehicle processing unit is configured to perform an obstacle avoidance cancellation vehicle returning step, and the at least one following vehicle processing unit is configured to determine whether to stop a vehicle platoon according to a longitudinal distance between the leading vehicle and the at least one following vehicle and a sensed distance of the sensing device;

wherein in response to determining that the at least one following vehicle free space and the collision distance do not meet the obstacle avoidance safety condition, the safety confirmed result is a third state, and the at least one following vehicle processing unit is configured to perform an obstacle avoidance cancellation emergency braking step to stop the vehicle platoon.

* * * * *